United States Patent
Nakash

(10) Patent No.: US 9,537,711 B2
(45) Date of Patent: Jan. 3, 2017

(54) METHOD FOR PROVIDING PROTECTED CONNECTION BETWEEN L2 COMMUNICATION NETWORKS

(71) Applicant: ECI Telecom Ltd., Petach Tikva (IL)

(72) Inventor: Shell Nakash, Kfar Saba (IL)

(73) Assignee: ECI TELECOM LTD., Petach Tikva (IL)

( * ) Notice: Subject to any disclaimer, the term of this patent is extended or adjusted under 35 U.S.C. 154(b) by 0 days.

(21) Appl. No.: 13/747,878

(22) Filed: Jan. 23, 2013

(65) Prior Publication Data

US 2013/0188476 A1    Jul. 25, 2013

(30) Foreign Application Priority Data

Jan. 24, 2012  (IL) .......................................... 217698

(51) Int. Cl.
*H04L 12/24*          (2006.01)
(52) U.S. Cl.
CPC ....... *H04L 41/0668* (2013.01); *H04L 41/0663* (2013.01)
(58) Field of Classification Search
CPC .......................... H04L 41/0663; H04L 41/0668
See application file for complete search history.

(56) References Cited

U.S. PATENT DOCUMENTS

| | | | | |
|---|---|---|---|---|
| 8,175,078 | B2 * | 5/2012 | Voit et al. | 370/351 |
| 8,724,456 | B1 * | 5/2014 | Hong et al. | 370/225 |
| 2004/0174887 | A1 * | 9/2004 | Lee | 370/395.53 |
| 2006/0047851 | A1 * | 3/2006 | Voit et al. | 709/239 |
| 2007/0008982 | A1 * | 1/2007 | Voit et al. | 370/401 |
| 2009/0274155 | A1 * | 11/2009 | Nakash | 370/395.53 |
| 2010/0014531 | A1 * | 1/2010 | Pirbhai et al. | 370/401 |
| 2013/0100854 | A1 * | 4/2013 | Tatikonda et al. | 370/254 |

* cited by examiner

*Primary Examiner* — Jianye Wu
(74) *Attorney, Agent, or Firm* — Browdy and Neimark, PLLC

(57) ABSTRACT

A method and system are provided for connecting at least three provider peer elements PEs located in two L2 network sites, via a provider network, wherein at least in one of the L2 sites and two of the provider peer elements PEs are connected to a customer equipment CE forming together a dual homing structure. The method and system are characterized in that they rely on the use of only a single PW in the provider network that extends between PEs of the two L2 network sites while ensuring traffic protection for the PW in the provider network, and ensuring that in case of a failure of one of the PEs or its connection to the customer equipment at one of the sites, the other L2 network site remains unaware of the failure, so that once established, traffic communication over the PW is maintained like no failure has happened.

11 Claims, 6 Drawing Sheets

METHOD FOR PROVIDING PROTECTED CONNECTION BETWEEN L2 COMMUNICATION NETWORKS

CROSS-REFERENCE TO RELATED APPLICATIONS

This application claims priority of Israel Patent Application No. 217698, filed Jan. 24, 2012, the disclosure of which is incorporated by reference herein in its entirety.

TECHNICAL FIELD

The present invention relates to a method for providing protected connectivity between layer 2 (L2) networks. More specifically, a method is provided for a virtual pseudo wire (PW) redundancy for L2 virtual private networks (TENs).

BACKGROUND

L2 Network

An L2 network (abbreviation for Layer 2 network) is composed of L2 bridges (a.k.a., L2 switches, switches) connecting local area networks (LAN) or IEEE 802.1Q compatible virtual LAN (VLAN) segments containing end stations. A switch forwards L2 frames among its interfaces (ports) based on L2 media access control destination address (MAC DA) contained in each packet. The switch performs address learning based on L2 MAC source address (MAC SA) carried by each packet, a procedure referred to as "MAC learning" or "Address Learning" into a so called MAC database. When a switch receives a packet with a known unicast (UC) DA, i.e., an address it has previously learned to be the SA, it would forward the packet to the very same port through which packets that were used by the switch to learn that address, were received. Otherwise, when the DA is an unknown unicast (has not been learned) or multi-destination (multicast, MC, or broadcast, BC) packet, it would forward a packet copy (a.k.a., MC replica) to all the ports, an action referred to as flooding. A port may belong to multiple LANs, known as virtual LANs (VLANs), where address learning and forwarding is based on L2 address combined with VLANs carried by the packets.

A service provider (also referred to hereinafter as "provider") may map the customer traffic into Provider Service VLANs (SVLANs) using VLAN stacking techniques (also referred to as Q-in-Q encapsulation), in order to partition customers traffic.

MPLS

MPLS is a technology used for fast delivery of packet-based traffic along pre-established logical paths referred to as label switched paths (LSPs, a.k.a. tunnels). MPLS supports traffic engineering (TE) to optimize usage of network resources, and is designed to offer a reliable traffic delivery, with predictable quality of service (QoS) and capacity (a.k.a., bandwidth, BW) guarantees.

Traffic is delivered along an LSP from a source (a.k.a., ingress) node (a.k.a., label switching router, LSR) downstream to a destination (a.k.a., egress) LSR. The LSP may traverse multiple intermediate (a.k.a., transit) LSRs.

FIG. 1 illustrates an LSP that originates at ingress LSR1, traverses through transit LSR2 (from port "A" to port) and transit LSR3, and terminates at egress LSR4. The LSP path may be summarized as 1-2-3-4.

A major MPLS feature is the support of automatic traffic restoration. When a link or node failure is detected along the LIP path, a protection mechanism is initiated to detour the failed element and restore the traffic. Examples for such mechanisms that are used in the art are End-to-end (E2E) LIP protection and MPLS fast reroute (FRR).

MP VPNs and PWs

A virtual private LAN service (VPLS) emulates the functionality of a LAN, making it possible to interconnect multiple remote access networks via a common provider network, a.k.a., multipoint-to-multipoint (MP) connectivity, wherein all the access networks behave as a single LAN or VLAN. With VPLS, to all these access networks the same L2 virtual private network (VPN) identifier would be assigned. This is analogous to assigning to them the same SVLAN in an Ethernet-based provider network. For the convenience of the reader, both SVLAN and VPLS will be referred to herein as MP VPNs.

With VPLS, Ethernet packets arriving from the access network node (called, customer equipment, CE) are encapsulated within a multi-protocol label switching (MPLS) header, and based on this header they will be forwarded across the provider network towards the remote sites.

VPLS architecture implements full mesh connectivity between the provider edge (PE) nodes that connect the customer access networks, and allow each access network to communicate with any other access network belonging to the same VPN.

A PE to PE connectivity (a.k.a., L2 pipe) for carrying VPN traffic is referred to as a pseudo-wire (PW). A PW carries traffic of a single VPN, and operates in a bidirectional type of operation, i.e. traffic flows there-along in both directions. When multiple VPNs are required per a given physical link, each VPN would have its own PW flowing in parallel with the other PWs.

The PW itself is carried by two LSPs flowing in opposite directions from one PE endpoint to the other and vice versa. Packets sent over PW are marked with identifier called PW label. The PW label, used to mark the packets is normally designated by the PE endpoint which would accept these packets, in a manner referred to as "downstream label assignment". The PW label can also be designated by the PE endpoint which would send the packets, in which case the operation is referred to as "upstream label assignment".

FIG. 2 illustrates a PW whose endpoints are LSR1 and LSR4. The LSP of FIG. 1 could be used to carry the PW traffic from LSR1 to LSR4, while another LSP from LSP4 to LSR1 would carry the PW traffic at the opposite direction.

An alternative option to using Ethernet-VLAN for connecting a CE to provider's network is to associate customer traffic with specific VPN, in which case the connection is referred to as spoke PW. When implementing such as alternative, known as hierarchical VPLS (H-VPLS), Ethernet packets already arrive at an encapsulated form with MPLS headers, from the CE to the provider network PEs.

P2P VPNs

A virtual private wire service (VPWS) emulates the functionality of a leased line, making it possible to interconnect two remote sites or CEs via an intermediate network. This service is referred to as point-to-point (P2P) VPN.

Like VPLS, a P2P VPN utilizes a PW to carry traffic across the provider's network. It may also utilize H-VPLS to connect customer sites or CEs to the provider's PEs.

The main advantage of P2P VPNs over MP VPNs is a reduction in complexity and costs of managing many connections. Unlike MP VPNs, there is no need to perform. MAC address learning, because all the traffic arriving from one site should be delivered to the other site. Disabling MAC learning saves processing effort thereby improving the switch performance.

Redundancy

An important feature of packet-based applications is effective redundancy, which is required in fault-tolerant and reliable networks. A particular case of interest is fault tolerant connectivity between a CE to provider's network, where the CE is dual homed to the provider network PEs (sometimes, referred to as gateways, GWs) via two connections of Ethernet-VLAN or H-VPLS spokes, such that when one connection fails, the remaining connection serves for carrying the traffic.

Major advantages of redundancy are: 1) Avoiding L2 loops, where traffic traverses a PE or CE more than once. When a loop is not avoided, traffic would keep on circulating across the network and might either never arrive to its destination or be returned to the sender CE; 2) Speed of recovery. Preferably, a sub-200 milliseconds recovery is required upon a failure of CE-PE connection, PE-PE connection, or PE; 3) The amount of additional capacity required due to the add-on of the redundancy feature, as a substantial additional capacity would be a significant detriment to using redundancy; 4) Complexity and scalability. Redundancy solutions where the customer CE and is not involved (e.g., no need to exchange signaling messages), the dual homing awareness is restricted to a single site (i.e., run between the dual homing PEs), and the signaling exchange introduces very light load, are much preferred.

Models

A model that will be referred to hereinafter as the Primary model which is shown in FIG. 3 comprises two sites. Site 1 consists of CE1 that is dual homed to PE-A and PE-B, where PE-A and PE-B are logically inter-connected and combined into virtual. PE (V-PE). Site 2 consists of CE-2 that is connected to PE2. The two sites are connected via a PW, extending between the V-PE and PE2, and passing, for example, via a provider network also being an L2 network).

A model referred to hereinafter as the Secondary model which is demonstrated in FIG. 4 comprises two sites. Site 1 consists of CE1 that is dual homed to PE-A and PE-B, where PE-A and PE-B are logically inter-connected and combined into V-PE 1. Site 2 consists of CE2 that is dual homed to PE-C and PE-D, where PE-C and PE-D are logically combined into V-PE 2. The two sites are connected via a PW, extending (say, in a provider network) between V-PE 1 and V-PE 2.

The dual homing of Ca to PE at FIG. 3 and FIG. 4 may be realized via either Ethernet-PLAN or H-VPLS PW connectivity. It should be noted that sites 1 and 2 are logical, while actually the PEs of the V-PE could be located at different physical locations, and with intermediate PEs in-between.

A typical application exemplifying the advantage of the Primary model over prior arts is illustrated at FIG. 5, where a "hub" site is connecting multiple "spoke" sites CEs to its "hub" router R. This hub-and-spokes configuration could be used for example to connect many spoke sites to the Internet through the hub site. If only one rather than two PWs is required per spoke site, the provider would be able to connect twice as much spoke sites to the Internet. Another advantage could be reduced operational burden. If the signaling and configuration overhead related to dual homing takes place at the (often central) hub site, while the (often remote) spoke sites need only to manage a single PW and are unaware of the redundancy (e.g., do not need to implement PW protection mechanisms), that would be a much preferred solution.

Exemplary Solutions Known in the Prior Art

Quite a few methods were proposed in the rat for fault tolerant connections between L2 devices and networks, but all of which require more than one PW connection between remote L2 sites:

(1) US 2006/0047851 proposes a method at which a local node u-PE (CE) is dual homed to two local nodes Agg-PEs and can communicate with remote nodes u-PE in a loop-free manner, wherein all of the involved local/remote u-PEs and Agg-PEs run a common xSTP protocol in order no break the L2 loop, and "a Primary data path is provided along with first and second redundant data paths that include first and second redundant PWs, respectively, connected across the core network". In other words, by the method described in this publication, two PWs are used, one Primary and one standby, in order for the solution to operate.

(2) draft-ietf-pwe3-redundahcy-04.txt describes PW redundancy scenarios, along with methods for dealing with them. All methods rely on establishing multiple PWs between the two opposing sites, some of which are active while some are in standby (FIGS. 2 through 7).

SUMMARY OF THE DISCLOSURE

As discussed hereinabove, the typical prior art solutions use two or more PWs to achieve redundant L2 connectivity.

Thus, one of the objects of the present invention is to satisfy a long felt need by providing a method to implement a simple, network capacity economic, fault tolerant connectivity solution, which would provide sufficient redundancy for connecting two L2 networks.

Another object of the present invention is to provide a method and system for supporting the topologies illustrated in FIG. 3 and FIG. 4, where a single PW connection of either P2P or MP VPN between the two opposing sites, provides auto recovery upon a fault occurring at a. V-PE of one or both sites, where the fault can be a failure of a single PE and/or its CE-PE connection.

Another object of the present invention is to provide a method and a system where only PEs which are part of a V-PE should be aware of the redundancy arrangement. Particularly, from viewpoint of PE2 (FIG. 3) the solution provided sets up an ordinary PW with remote site and is kept uninvolved in the redundancy and the failure recovery.

According to another object of the present invention there is provided a method and a system wherein the exchange of signaling for the purpose of the redundancy arrangement is carried out only between the PEs of the same V-PE, and thus does not introduce heavy signaling load. Particularly, PE-A/PE-B at FIG. 3 (FIG. 4) should not be required to exchange redundancy-related signaling with PE2 (PE-C/PE-D), respectively.

According to another object of the present invention there is provided a method and a system wherein the recovery of certain failures may be carried automatically and capable of being completed within a relatively short time (e.g. under 200 millisecond).

By yet another object of the present invention there is provided a method and a system wherein it is possible to apply ordinary protection mechanisms such as MPLS FRR, for failures of the PW due to faults at the provider network (e.g., fiber optics cut or a failure of a transit node).

In accordance with another object of the present invention there is provided a method and a system wherein the no L2 loops occur while operating during both normal and failure scenarios.

According to another object of the present invention there is provided a method and a system using a single PW for redundancy while connecting two L2 networks, which in turn consumes only about 25-50% of the network capacity.

The concept underlying the proposed method and system may be referred to as virtual PW redundancy, for being capable of providing PW redundancy while still using a single PW connectivity between two provider sites. In other words, the object and the underlying concept of the invention is to achieve redundancy as if there are at least a pair of Primary-Standby PWs, while actually only a single PW is established between two provider sites, thereby reducing dramatically the bandwidth consumption.

For the convenience of the reader, the description, which follows, will focus mainly on the Primary model illustrated in FIG. 3. Later on, it will be generalized to cover the Secondary model illustrated in FIG. 4 as well.

According to a first aspect, there is provided a method for connecting at least three provider peer elements PEs located in two L2 network sites, is a provider network, wherein at least in one of the L2 sites and two of the provider peer elements PEs are connected to a customer equipment CE forming together a dual homing structure, wherein the method is characterized in that it comprises providing only a single PW in the provider network extending between PEs of the two L2 sites while ensuring traffic protection for the PW in the provider network, and ensuring that in case of a failure of one of the PEs or its connection to the CE at one of the sites, the other L2 site remains unaware of the failure, so that once established, traffic communication over the PW is maintained like no failure has happened.

According to another embodiment, there is provided a method for connecting two L2 network sites via a provider network, using at least three provider peer elements PEs, wherein at least one of the sites comprises a pair of provider peer elements PEs (to which the L2 network site is dual homed), the method comprises the steps of:

establishing a single PW in the provider network extending between the two L2 network sites, the PW being formed between two PEs, one at each site, being formal endpoints for the PW, and is carried out by two LSPs each configured to carry traffic at the opposite direction from the other, and traversing the other provider peer element. PE of each site, being non-formal endpoint for the PW when present;

providing Master-Slave signaling between said pair of PEs within one and the same L2 site only so that at each of the L2 sites one PE has a role of Master PE and the other, if present and functional, has a role of Slave PE;

exchanging signaling information only between the pair of PEs within one and the same L2 network site and not with PE or PEs of the other L2 network site;

providing traffic connectivity between the two L2 sites via the two Master PEs of the two L2 sites and said PW;

ensuring that a Slave PE has inactive connection to a local CE and ensuring that, if the Slave PE is not failed and is used as the PW non-formal endpoint, said slave PE serves as a transit PE, thereby transparently forwarding traffic of the PW;

ensuring traffic protection for the LSPs in the provider network by bypassing a non-formal endpoint when an ISP fails.

In case of a failure in a Master PE and/or its CE-PE connection, the other PE (PE-B) of that pair of the same L2 network site would take over and be considered as the new Master. This way, the PE or PEs of one L2 network site remain unaware of changes in the other (remote) L2 network site (say, PE2 of FIG. 3 is unaware of the dual homing structure PE-A & PE-B at the remote L2 site, nor about changes of Master-Slave status, so it would have no disruption to its own operation).

The notion and the arrangement of formal endpoints, as proposed by the present invention, allow the remote site to remain unaware of the dual homing arrangement and changes in the Master-Slave roles. In other words, the remote site is made to think it has a PW towards the formal endpoint, regardless of whether the formal endpoint is a Master or a Slave or is even functional at all. If a non-formal endpoint, becomes the Master, it behaves as an alias of the formal endpoint, making the remote site operate as if the formal endpoint is still functional. Particularly, the PE with no dual homing, say, PE2 of FIG. 3, is unaware of the redundancy (or rule changes) in the other L2 site.

If the new Master is a non-formal endpoint, it would preferably appear to be the formal endpoint, e.g., for the purpose of MAC learning at MP VPN.

The PW is established only once between two formal endpoints, regardless of their roles, and there is no need to await the Master-Slave election (i.e. for exchanging signaling for purpose of redundancy). The PW is not established between a Master and a. Slave, as these roles can dynamically be changed.

For MP VPN, the MAC learning always associates the addresses learned from remote L2 site with the remote formal endpoint regardless if the latter is currently a Master or a Slave or if it is at all functional. Thus, even if a formal endpoint PE fails, it is still considered the endpoint of the PW for the purpose of MAC learning. If the situation changes and a Slave becomes a Master, the PW remains to be "formally" established between two formal endpoints.

According to another embodiment, each of the sites comprises local network element, the customer equipment. CE, wherein at least at one of the L2 sites, the local CE is dual homed to the pair of PEs. The local CE of the other L2 site may connected to a single local PE.

By still another embodiment the method comprises the following steps and/or operations:

selecting a PE to operate as a Master PE at a L2 network site;

activating a connection extending between the selected Master PE to an associated a customer equipment, CE, thereafter forwarding traffic to/from the associated CE from/towards the single PW;

in case of failure in the L2 network site comprising the pair of PEs, and if said failure is a fault of a CE connection, to the Master PE, or if said failure is a fault of the Master PE, selecting another PE belonging to the failed L2 site to operate as a new Master. This failure is preferably followed by re-selecting the role of the PEs in the pair of PEs and by switchover in accordance with the re-selection.

By another embodiment, the method further comprises a modified manner of MAC address learning for L2 network sites being multipoint-to multipoint (NT) VPN, by which the method comprises:

when a Pb operative as a Master PE receives a data packet comprising a new MAC source address over the single PW which has be forwarded from a remote L2 site or from the directly connected CE, associating the new MAC source address with a remote formal endpoint regardless of whether that formal endpoint is operative, and if it operative, whether it is operative as a Master or as a Slave, or with the directly connected customer equipment, respectively, and storing the newly received source address accordingly.

Additionally, when a PE becomes a Master PE, it flushes the previously learned MAC addresses associated with the MP-VPN stored thereat, since they might provide wrong or outdated information.

In accordance with still another embodiment, the method further comprises bypassing a non-formal endpoint in case of its failure. The bypassing of the non-formal endpoint is part of the FRR and/or of the End-to-End (E2E) ISP protection mechanisms intended for protecting the ISP that carries the PW.

As has already been mentioned, typically both PEs of the pair would be respectively connected to the local, common customer node CE, and the method comprises ensuring traffic flow between the CE and one of said (dual homing) PEs currently being selected as the Master of that pair.

According to a second aspect, there is provided a system for interconnecting two L2 network sites, wherein the system comprises:

a first L2 network site, a second L2 network site, a provider network interposed between the two L2 network sites;

a first L2 network site, a second L2 network site, a provider network interposed between the two L2 network sites;

at least three provider peer elements PEs, out of which a pair of provider peer elements PEs are located at the first. L2 network site and connected to a local customer element CE dual homed to the pair of peers, and at least one of said at least the provider peer elements PEs is located at the second L2 network site, wherein the first and the second network L2 sites are interconnected via a single PW connection extending within the provider network and between two PEs of the different L2 network sites;

wherein the system is characterized in that it is configured to:

ensure traffic protection for the PW in the provider network; and ensure that in case of failure of one of the PEs or its connection to the CE at the first L1 site, the second L2 site remains unaware of the failure, so that traffic communication over the PW can be maintained as if no failure had occurred.

According to another embodiment of this aspect, the system comprises:

means for affecting master-slave signaling between PEs within one and the same L2 site only, and means for maintain L2 traffic connectivity between the first and second L2 network sites via a single PW, wherein the single PW being formed between the two PEs, one at each site, referred to as formal endpoints, the PW being carried by two LSPs each configured to carry traffic at the opposite direction from the other and traversing the other provider peer element PE, if present, of each site, the other provider peer element being referred to as non-formal endpoint;

the system is further characterized in that traffic protection is ensured for the LSPs within the provider network; and at each of the L2 sites, one PE has a role of Master PE and the other, present and functional, has a role of Slave PE, so that if a Master PE fails, the other PE of the same L2 network site takes over and becomes a new Master, thereby ensuring that Pb or PEs of the other L2 network site would be unaware of the change that has occurred.

According to another aspect there is provided a peer node in a dual homed structure V-PE (comprising a pair of peer nodes PEs connected to a customer element CE, all located within an L2 network site), the peer node being provided with a Control Unit CU capable of supporting and implementing operations of the above-described method.

FIG. 6 which will be referred to in the following section of the Detailed Description, illustrates a V-PE State Diagram for the control unit which may be located at each of the L2 sites for selecting a Master PE at one site, and a Master Pb at the other site, in order to provide inter-network communication by Master PE(s) of the two sites via a single PW connecting the two sites.

FIGS. 11, 12, 13, which will also be referred to in the Detailed Description, illustrate additional novel functionality which may be originally provided in the CU, and/or downloaded to the CU from a management entity in accordance with the present invention.

According to yet another aspect of the invention there is provided a computer readable medium storing a computer program for performing a set of instructions to be executed by one or more computer processors, the computer program is adapted to perform the method according to the above description. The computer readable medium may reside in a management entity, for example in an EMS or NMS of the system, being responsible for establishing the proposed virtual PW redundancy configuration. However, the computerized system may be understood as encompassing the above-described system for interconnecting L2 sites, comprising the peer nodes which comprise CUs capable of supporting and implementing the method.

By another aspect there is provided a management entity for managing interconnection between two L2 network sites, using provider peer elements PEs at said sites and a provider network that extends between the sites; wherein two of the PEs are located in a first L2 network site, and at least one PE is located at the second L2 network site, a customer element CE-1 is associated with the first L2 network site, and a customer element CE-2 is associated with the second L2 network site, wherein the management entity being capable of:

dual homing the customer CE-1 to the two PEs in the first L2 network site, so that the CE-1 is connected to each of the two PEs;

if the second L2 network site comprises only one PE, connecting it to the customer element. CE-2; in case there are two PEs thereat, connecting both PEs to CE-2;

configuring one of the PEs at the first L2 network site as a formal endpoint, and the other PE as a non-formal endpoint;

in case there is only one PE in the second L2 network sit configuring it as the formal endpoint, without a need to establish a signaling channel in that site;

creating a signaling channel between the two PEs of the first L2 network site, to form a virtual PE (V-PE), and using the signaling channel for dynamic Master-Slave negotiation;

creating two LSPs each configured to carry traffic at the opposite direction from the other along a path extending between the two formal endpoints, wherein each LSP traverses through the non-formal endpoints of the two L2 network sites; and creating a single PW extending between the two formal endpoints, and said PW being carried by said two LSPs.

BRIEF DESCRIPTION OF THE DRAWINGS

For a more complete understanding of the present invention, reference is now made to the following detailed description taken in conjunction with the accompanying drawings wherein.

DETAILED DESCRIPTION OF PREFERRED EMBODIMENTS

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

Following are some illustrative examples that are not intended in any way to restrict the scope of the invention, but rather to ease the reader's understanding of the disclosure.

FIGS. 1-5 have been described in the Background description of the invention.

Figure 6:
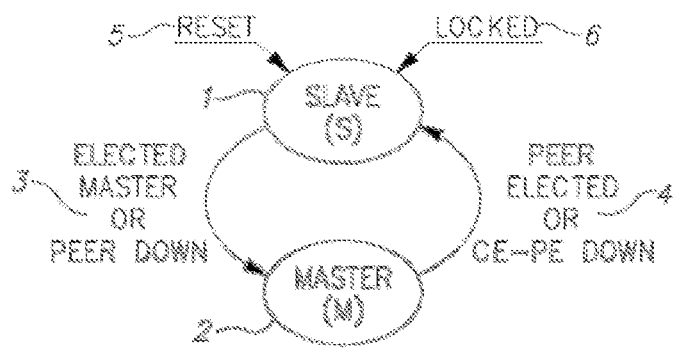
FIG. 6 illustrates a Master-Slave V-PE state diagram.

FIG. 6 is a schematic illustration of a Master-Slave Operation, required for implementing and understanding the method provided by the present invention. Each PE within a V-PE is operative either as a Master or as a Slave. The role defines the PE's L2 forwarding behavior. At any given moment, there should be one Master PE, while the other (if indeed present and is functional) would act as a. Slave.

The PEs of the V-FE use so-called Hello signaling exchange to select the Master PE, listing configuration and status information of each sender PE. The Hello communication path should be reliable, e.g., protected against failures at the provider network, since the PEs rely on it for making its own forwarding decisions. It should also be fast, to enable support of a fast switchover upon the failure of a FE or of a CE-PE connection. Selection could be based on pre-assigned priority and a unique identifier as a tiebreaker in selecting the Master PE.

Initially or following a restart (a.k.a., reset), a PE is at the Slave state. Once it is selected as a Master PE, it moves to the Master state. When conditions change, a role re-selection can take place, after which the former Master PE may become the Slave PE, and the former Slave PE may become the Master PE.

In the absence of Hello communication (e.g., a loss of preconfigured number of Hello messages), as would typically occur if one PE is Down, the other PE will take over the Master role.

In case that the CE-PE connection is Down, the directly connected PE would report this fact to its V-PE peer. A Master PE reporting this fact would become a Slave PE, while the peer element would become the new Master PE. A Master PE can also move to the Slave state when it is "Locked". A locked situation happens when the PE detects a configuration mismatch with the peer PE or when it is forced by configuration to become a. Slave (Forced Slave). While locked, a PE cannot become the Master PE.

CE Connection

A Master PE must always keep its CE-PE connection active. A Slave PE may shut down its connection to the local CE to prevent the local CE from using the connection. Alternatively, the CE-PE connection could be activated/inactivated using signaling (e.g., LACP per IEEE 802.3ad).

Figure 11:
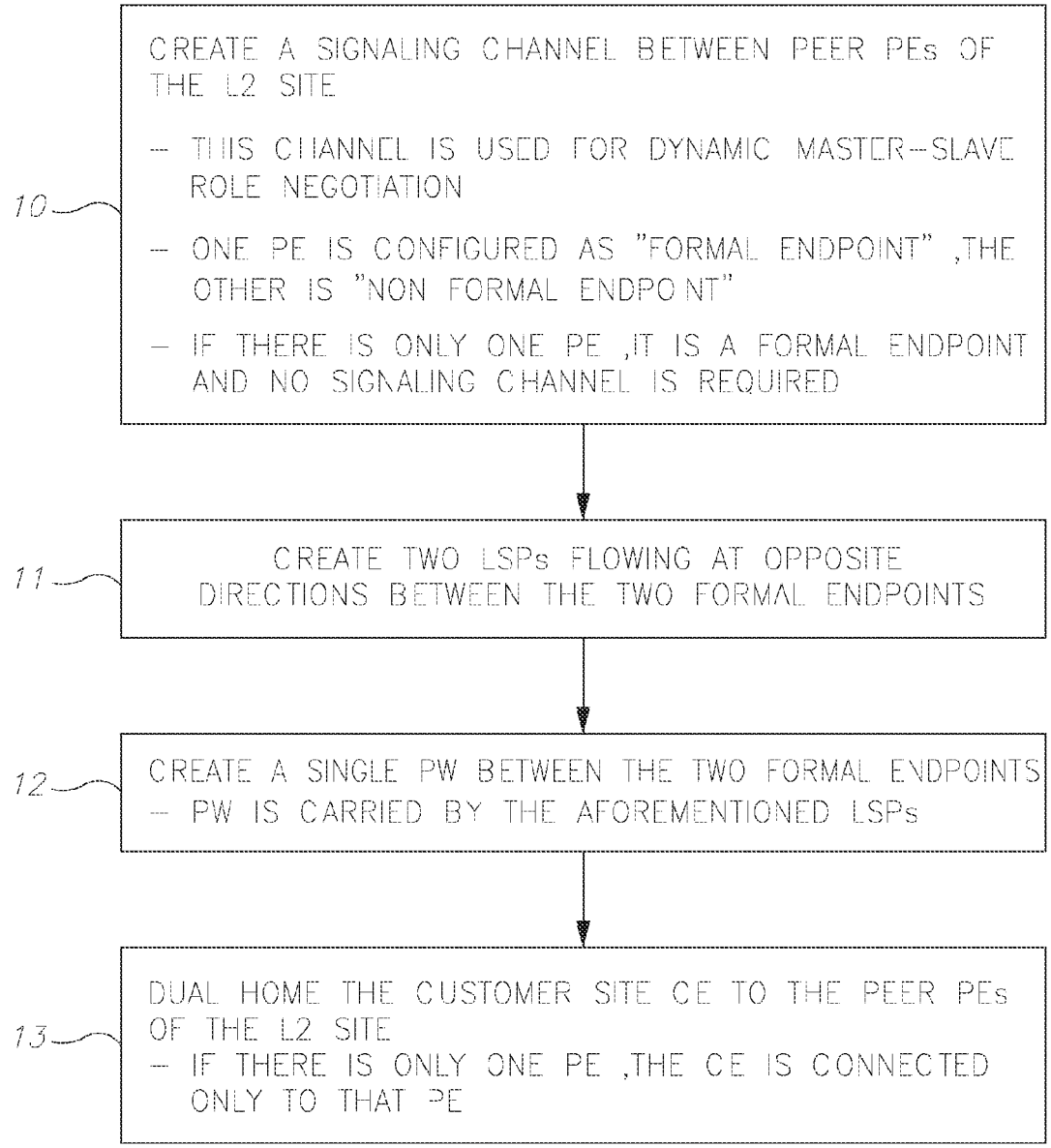
FIG. 11 illustrates schematically a block diagram of one embodiment of the system for implementing the proposed method.
Figure 12:
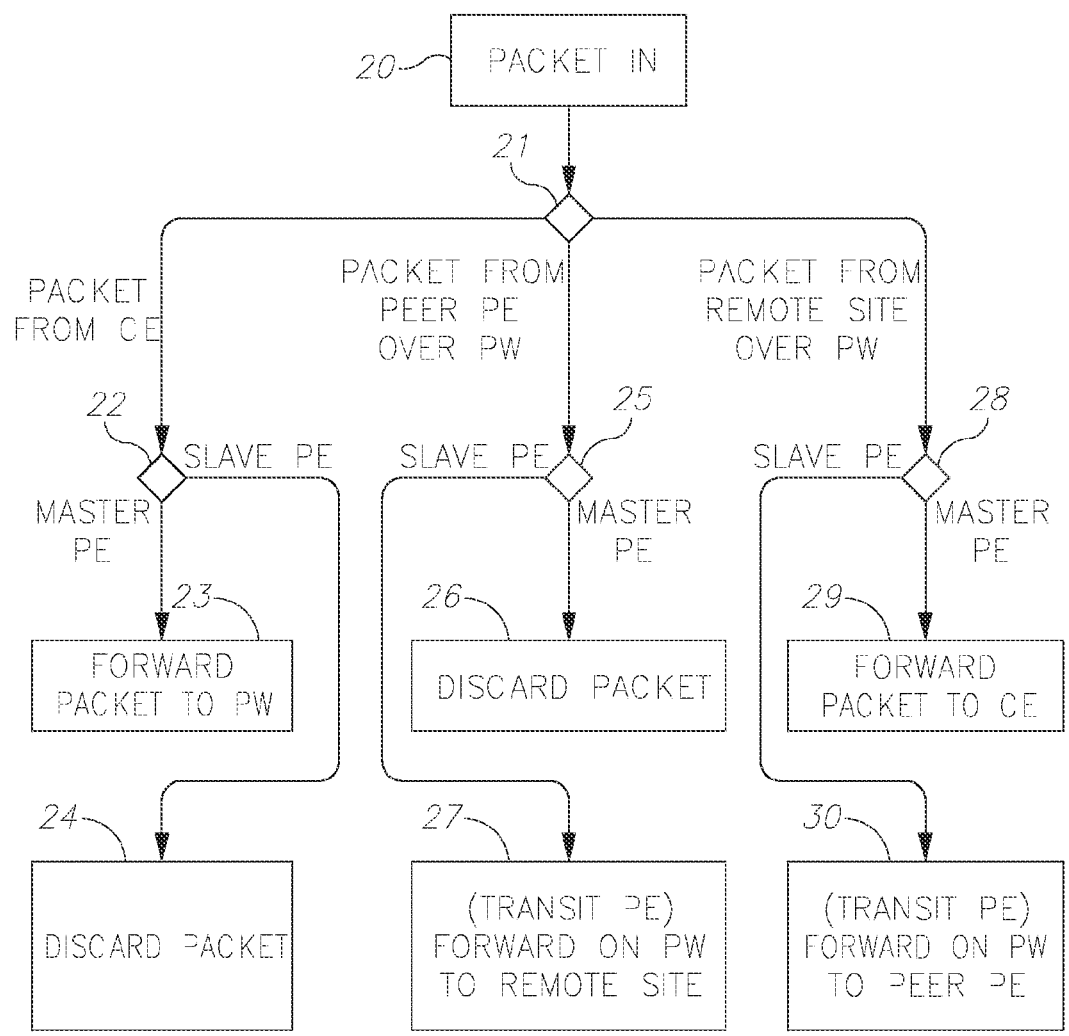
FIG. 12 illustrates a flow chart for making forwarding decisions at a PE being a part of a V-PE.
Figure 13:
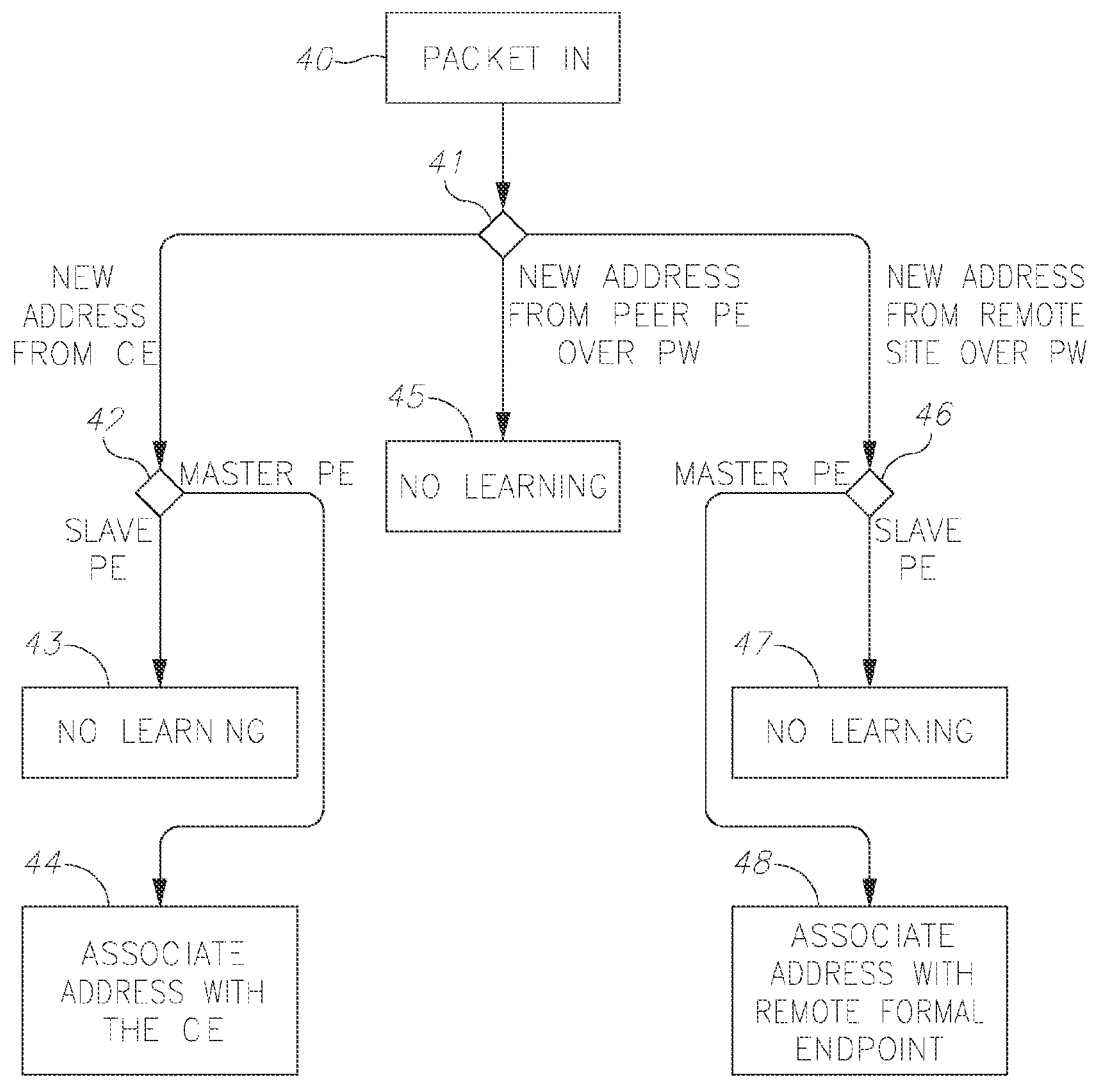
FIG. 13 illustrates a flow chart for making address learning decisions at a PE being a part of a V-PE.

By suggesting a state diagram for a PE which is part of a V-PE, FIG. 6 also describes a control unit CU and hardware at the PE, which is provided with the novel proposed software and ensures operation according to the demonstrated block diagram. Additional novel functionality of the Control unit CU may be downloaded from a novel management entity, as illustrated at FIGS. 11, 12, 13.

Block/state 1 (2) represents a Slave (Master) state of the PE, respectively.

Block/step 3 represents a transition from the Slave state to the Master state, when either the PE was selected (with the aid of the Hello messaging over the signaling channel) as a Master, or the PE detected that the peer PE is down (e.g., no Hello messages received from the peer PE during a pre-defined time).

Block/step 4 represents a transition from the Master state to the Slave state, when either the peer PE was selected as a Master, or the (local) PE detected that its CE-PE connection is down.

Block/step 5 represents a forced transition to the Slave state, upon a software reset.

Block/step 6 represents a forced transition to the Slave state, when the PE is configured to be "Locked".

LSP Configuration

Figure 1:
FIG. 1 is a simplified block diagram of a Label Switched Path (LSP) established in an MPLS network.
Figure 2:
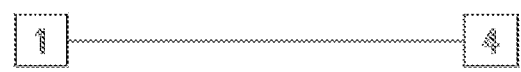
FIG. 2 illustrates schematically a PW.
Figure 3:
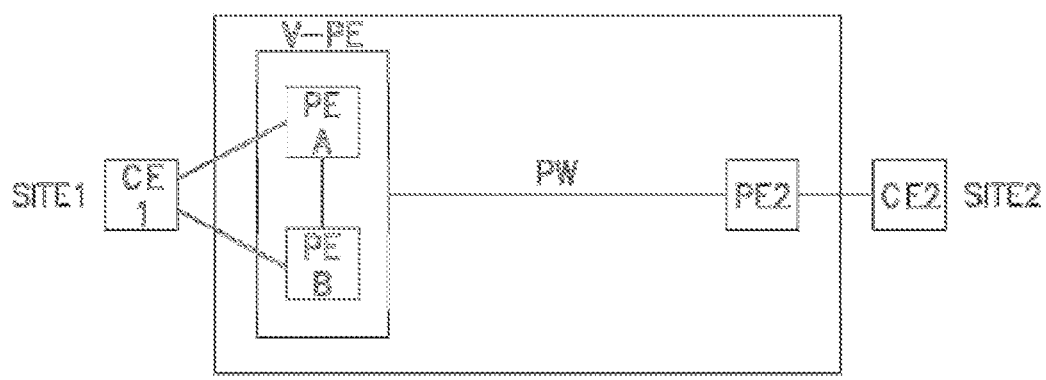
FIG. 3 is a schematic illustration of a. Primary model of connectivity between two L2 networks discussed herein.
Figure 7:
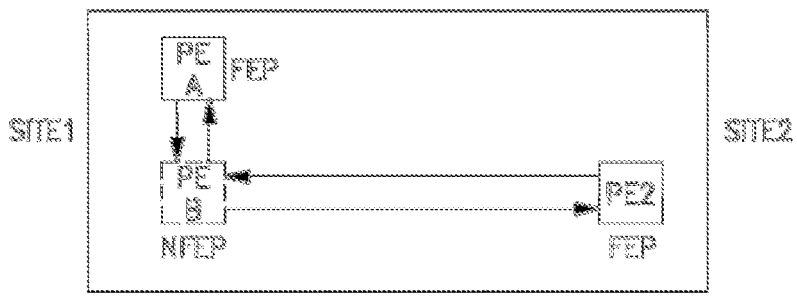
FIG. 7 illustrates schematically an LSP configuration of the Primary model.

FIG. 7 illustrates an ASP configuration for the Primary model of FIG. 3. A set of two ASPs is established (shown by oppositely directed arrows), originating at PE-A (PE2) of site 1 (site 2), traversing through PE-B and possibly some transit LSRs, and terminating at PE2 (PE-A), respectively.

PE-B acts as transit ASR (hereinafter, also Transit PE) when it operates as a Slave PE, and as ingress/egress LSR when it operates as a Master PE. This ASP pair is used to carry the single PW as described next.

PE-A and PE2, which never serve as transit PE for the LSP carrying the PW, will be referred to as non-formal endpoints (FEP), while PE-B will be referred to as a non-formal endpoint (NFEP).

Should a formal endpoint (say, PE-A) acting as Master PE and/or its CE-PE connection fail, the non-formal endpoint (PE-B) would take over to become the new Master and would appear to be the formal endpoint, e.g., for the purpose of MAC learning at MP VPN, so that the remote site would not experience any disruption. It should be noted, however, that PE-B of Site 1 never becomes the formal endpoint of the LSPs, it just appears that way by site 2, when it operates as a Master.

PW Configuration

Figure 8:
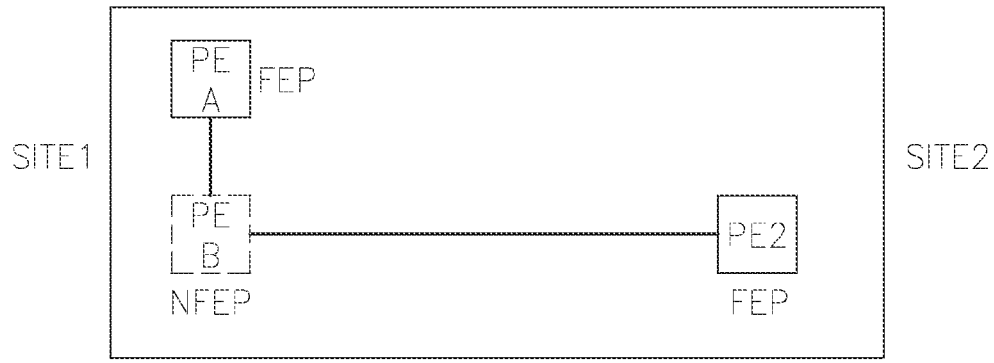
FIG. 8 illustrates schematically a PW configuration of the Primary model.

FIG. 8 illustrates a PW configuration for the Primary model of FIG. 3. A single PW is established between PE-A and PE2 being formal endpoints (FEP). The PW is carried by the ASP pair described above.

PE-B (NFEP) forwards PW traffic along the LSP when it acts as a Slave PE (being a transit PE), but would act as PW endpoint (FEP, as reflected for Site 2) when it operates as a Master PE.

The PW label used for packets flowing from site 1 to site 2 is assigned by PE2 using downstream label allocation. The PW label used for packets flowing from site 2 to site 1 is assigned by PE-A using downstream label allocation, and is configured at or communicated to PE-B, in a sort of upstream label assignment from the viewpoint of PE-B.

MAC Address Learning for MP VPN (i) PE2 receiving a new address (MAC SA) over the single PW from a remote provider site, associates the address with the remote formal endpoint of the PW, i.e., with PE-A.
(ii) Master PE receiving a new address (MAC SA) over the single PW from remote provider site, associates the address with the remote formal endpoint of the PW, i.e., with PE2.
(iii) Master PE receiving a new address (MAC SA) from the directly connected CE, associates the address with that CE.
(iv) When a PE becomes the Master PE, it would flush the MAC addresses associated with the MP-VPN, since they may provide a wrong or outdated info.

It should be noted that no MAC flushing is required at PE2 of site 2, nor MAC flushing indication between site 1 and site 2. The reason being that from site 1 viewpoint there is only one PW operative towards site 2.

Scenarios for the Primary Model

The following description applies for both P2P and MP VPNs, because both Master PE on site 1 and PE2 on site 2 have a single and a common PW to choose from when forwarding packets towards the other site.

PE2 is kept unaware of Master-Slave role change. It always learns addresses arriving from site 1 as if they were sent by the "FEP" PE-A, regardless of whether PE-A is Up or Down, or whether CE1 to PE-A connection is Up or Down, or whether PE-A is Master or Slave. Furthermore, PE2 does not need to apply any MAC flush, when the Master PE at site 1 is changed.

Normal Operation—PE-A Master

The term "normal operation" refers herein to the case where all CEs, PEs, and connections of FIG. 3 are operational. When PE-A is selected as Master PE, the CE1-PE-A is active while CE1-PE-B is inactive.

Traffic forwarded from CE1 (being the traffic source) flows to its destination beyond CE2 as follows:
Packet arrives to CE1.
CE1 forwards the packet over the active connection to Master PE-A.
Master PE-A forwards the packet over the single PW.
Slave PE-B acts as transit PE and forwards the packet along the LSP.
PE2 forwards the packet to local CE2.
Traffic is forwarded from CE2 flows to its destination beyond CE1 as follows:
Packet arrives to CE2.
CE2 forwards the packet to PE2.
PE2 forwards the packet over the single PW.
Slave PE-B acts as transit PE and forwards the packet along the LSP towards Master PE-A.
Master PE-A forwards the packet over the active connection to local CE2.

(iii) Normal Operation—PE-B Master

When PE-B is selected as a Master PE, the CE1-PE-B is active while the CE1-PE-A is inactive.

Traffic forwarded from CE1 flows to its destination beyond CE2 as follows:
Packet arrives to CE1.
CE1 forwards the packet over the active connection to Master PE-B.
Master PE-B acts as a PW endpoint and ingress LSR, and forwards the packet over the single PW.
PE2 forwards the packet to local CE2.
Traffic forwarded from CE2 flows to its destination beyond CE1 as follows:
Packet arrives to CE2.
CE2 forwards the packet to PE2.
PE2 forwards the packet over the single PW.
Master PE-B acts as PW endpoint and egress LSR, and forwards the packet over the active connection to local CE2.

(iii) PE-A Master Failure

When the Master PE-A fails, PE-B will take over and will operate as the new Master PE. It would then flush the MAC addresses (only in case of MP VPN) and activate the connection to CE1. Forwarding the traffic is then resumed per the steps listed in (ii).

(iv) PE-B Master Failure

When the Master PE-B fails, PE-A will take over and will operate as the new Master PE. It would then flush the MAC addresses (only in case of MP VPN) and activate the connection to CE1. Forwarding the traffic is then resumed per the steps listed in (i).

It should be noted that the LSP path should be recovered, to bypass the failed PE-B, as described in the following section (viii).

(v) CE-PE Master Failure

When CE-PE connection of the Master PE fails, the PE would report that status to its V-PE peer and will operate as a Slave PE, while the peer would operate as the new Master PE. The new Master PE would then flush the MAC addresses (only in case of MP VPN) and activate the connection to CE1.

Forwarding the traffic is then resumed per the steps listed in (i) or (ii), depending on whether the new Master is PE-A or PE-B, respectively.

(vi) PE Slave Failure

When a. Slave PE fails, no steps should be taken because the Master PE remains functional.

It should be noted that when the Slave PE is PE-B, the LSP path should be recovered, to bypass the failed PE-B, as described in the following section (viii).

(vii) CE-PE Slave Failure

When a CE-PE connection of the Slave PE fails, the PE will report that status to its V-PE peer. No further steps are required, because the reporter is already a Slave PE.

(viii) Provider Network Failures

A failure of the LSP due to faults in the provider network (e.g., optical fiber cut or a failure of a transit node) should be recovered using standard protection mechanisms, such as MPLS FRR. Except for case (iv) discussed above, where the failed node is also a Master PE. No Master-Slave role change is required, nor MAC flushing.

Secondary Model

Figure 4:
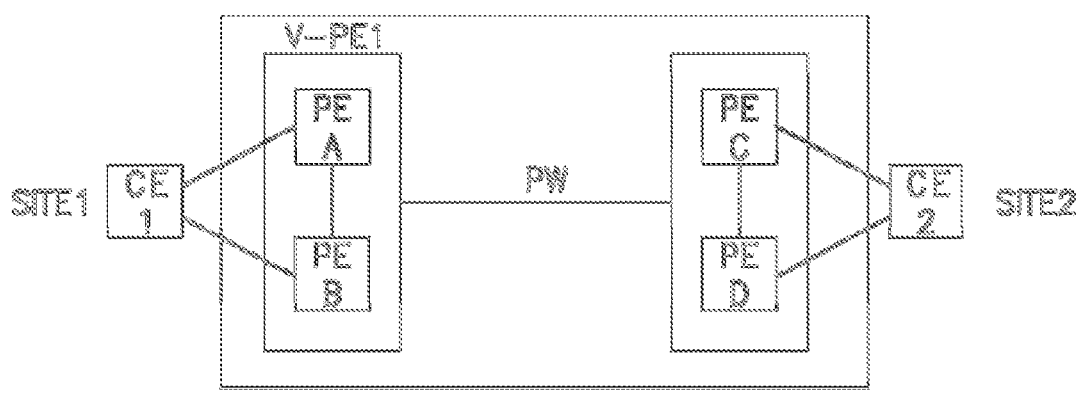
FIG. 4 is a schematic illustration of a Secondary model of the discussed connectivity.
Figure 5:
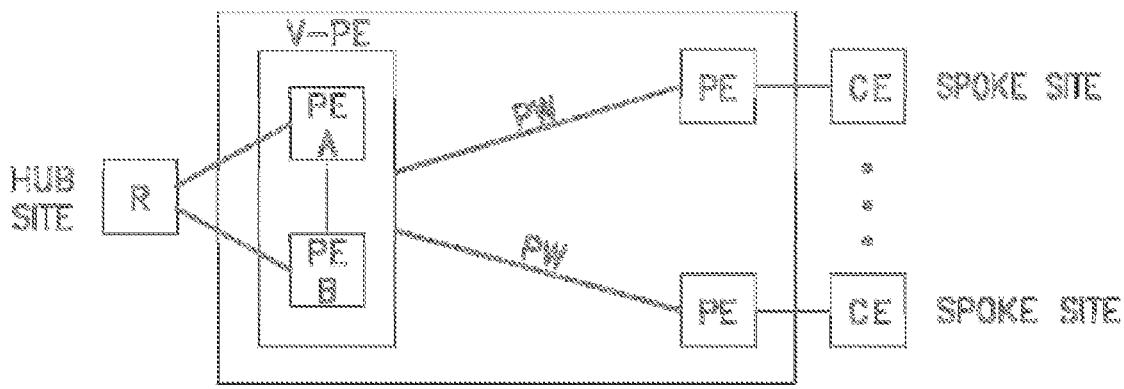
FIG. 5 is a typical known implementation of the Primary model.

The Secondary model illustrated in FIG. 4 is supported by replacing PE2 of the Primary model (FIG. 3) with a V-PE. The Master/Slave role selection is carried out independently at each of sites 1 and 2, and there is no need for exchange of signaling between the two sites in order to report or coordinate these roles.

LSP Configuration (Secondary Model)

Figure 9:
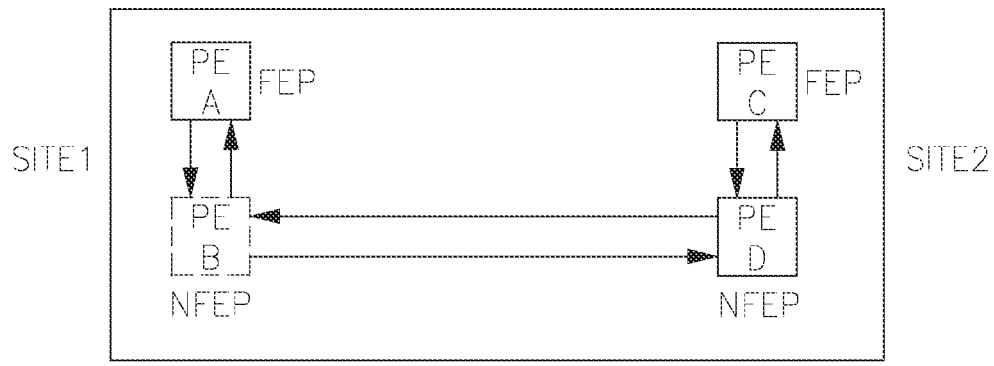
FIG. 9 illustrates schematically an LSP configuration of the Secondary model.

FIG. 9 illustrates an LIP configuration for the Secondary model of FIG. 4. A set of two LSPs is defined, originating at "FEP" PE-A (PE-C) and terminating at "FEP" PE-C (PE-A), respectively. Both LSPs traverse through PE-B and PE-D ("NFEP-s"), and possibly through some transit nodes.

PE-B/PE-D acts as a transit PE when it is a Slave PE, and as ingress/egress LSR when it is a Master PE. This LSP pair is used to carry the single PW as will be further described.

PE-A and PE-C, which never serve as transit PEs for the LSP carrying the PW, are referred to as formal endpoints (FEP). Consequently, PE-B and PE-D are referred to as non-formal endpoints (NFEP).

In case that a formal endpoint (say, PE-A) acting as a Master PE and/or its CE-PE connection fail, the non-formal endpoint (PE-B) would take over to become the new Master and would appear to be the formal endpoint, e.g., for the purpose of MAC learning at MP VPN, so that the remote site would not be sense any disruption to its operation.

PW Configuration (Secondary Model)

Figure 10:
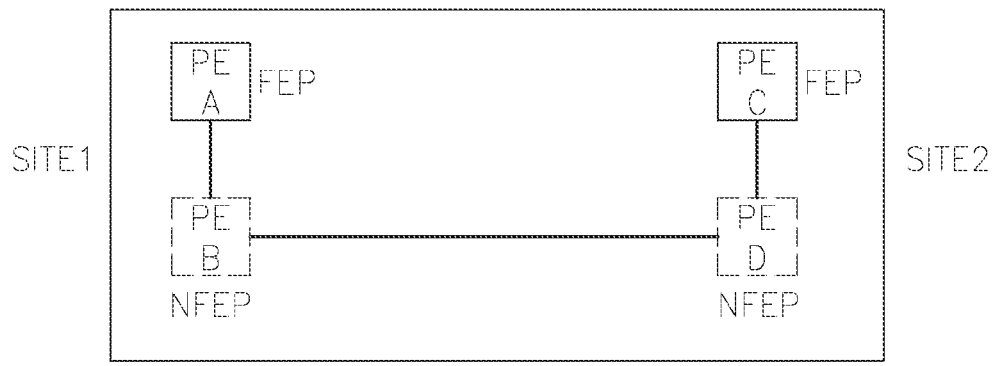
FIG. 10 illustrates schematically a PW configuration of the Secondary model.

FIG. 10 illustrates PW configuration for the Secondary model of FIG. 4. A single PW is established between PE-A and PE-C. The PW is carried by the LSP pair as described above.

PE-B/PE-D forwards PW traffic along the LSP when it is a Slave PE (being a transit PE), but would act as PW endpoint when it is a Master PE.

As mentioned, PE-A and PE-C are the formal endpoints.

The PW label that will be used for packets flowing from site 2 to site 1 (or from site 1 to site 2) is designated by PE-A (or PE-C as the case may be) using downstream label allocation, and is configured at or communicated to PE-B (PE-D), by using an upstream label assignment from the viewpoint of PE-Ti (PE-D), respectively.

MAC Address Learning for MP VPN (Secondary Model)

Master PE of site 2 receives a new address (MAC SA) over the single PW from remote provider site and associates the address with the remote formal endpoint of the PW, i.e., with PE-A.

Master PE of site 1 receives a new address (MAC SA) over the single PW from remote provider site, and associates the address with the remote formal endpoint of the PW, i.e., with PE-C.

Master PE receiving a new address (MAC SA) from the directly connected CE, associates the address with that CE.

When a PE becomes the Master PE, it would flush the MAC addresses associated with the MP-VPN, since they might provide a wrong or outdated info.

It should be noted that no MAC flushing indication between site 1 and site 2 is required, because from each site viewpoint there is only one PW extending towards peer site.

Scenarios for the Secondary Model

As will be appreciated by those skilled in the art, generalization of the Primary model scenarios is a rather straight-forward process, owing to the independent operation of V-PE or each site, to do that PE2 of FIG. 3 is replaced by the V-PE composed of PE-C and PE-D at FIG. 4 and the description for PE-A and PE-B is repeated for PE-C and PE-D.

For example, when PE-A (PE-D) is selected as a Master PE at site 1 (site 2), respectively, then traffic forwarded from CE1 would flow to its destination beyond CE2 as follows:

Packet arrives to CE1.

CE1 forwards the packet over the active connection to Master PE-A.

Master PE-A forwards the packet over the single PW.

Slave PE-B acts as a transit PE and forwards the packet along the LSP.

Master PE-D forwards the packet over the active connection to local CE2.

FIG. 11 demonstrates a block diagram for establishing a virtual PW redundancy configuration. This configuration is provisioned by a management system, such as EMS/NMS, and the flow chart can be understood as a block diagram of suitable software functioning at the EMS/NMS. The configuration can be downloaded to each involved node, or alternatively, may be downloaded to some of them, which would use signaling to communicate the configuration to the other nodes (e.g., the required LSP could be requested from the ingress LSR, which would setup the whole LSP path with the aid of signaling). The flow chart comprises the following steps:

Step/block 10: establishing a signaling channel between the peer PEs of an L2 network site, to form a V-PE. This channel is used for dynamic Master-Slave role negotiations. One of the PEs is configured as the formal endpoint, and the other would be the non-formal endpoint. If there is only one PE (e.g., PE2 of FIG. 3), it would serve as the formal endpoint and there will be no need for a signaling channel.

Block 11: establishing two LSPs flowing in opposite directions to each other between the two L2 network sites. The LSP traverses through the non-formal endpoints (being transit. PEs) of the two sites.

Block 12: establishing a single PW between the two formal endpoints, to be carried by the aforementioned LSPs.

Block 13: dual homing the customer CEs to the peer PEs. The CE should have a connection with each of the peer PEs. If there is only one BE (e.g., PE2 of FIG. 3), the CE will be connected only to that PE.

FIG. 12 demonstrates a flow chart for taking decisions at a PE which is part of a V-PE. The control unit CU and hardware at the PE are provided with the novel proposed software and ensures proper forwarding of data packets, arriving to the PE, according to the block diagram demonstrated.

In Block 20, an incoming data packet is received at the PE.

In Block 21, a check is carried out to determine whether the packet arrived:

a) from the directly connected CE, or b) over the single PW from the peer PE with which the PE shares a V-PE, or c) over the single PW from the remote provider site (L2 site).

For each of these three options, there are different follow up steps based on the determination made:

For option a) (i.e. the packet arrived from the directly connected CE) block 22 further checks whether the PE state is currently a Master. If in the affirmative, it forwards the packet over the PW (block 23), because this packet should go to the remote provider site (L2 site); otherwise (i.e., if the PE is a Slave), it discards the packet (block 24), because a Slave PE should not accept packets from the CE.

For option b), i.e. when received from the peer PE, block 25 further checks whether the PE state is currently a Master. If in the affirmative, it discards the packet (block 26), because a Master PE should not accept packets from the peer PE, which is supposed to be Slave; otherwise (i.e., if the PE state is currently a Slave), it functions as a Transit PE and forwards the packet transparently over the PW towards the remote site (block 26).

For option c), i.e. when received from the remote provider site, block 28 further checks whether the PE state is currently a Master. If in the affirmative, it forwards the packet to the directly connected CE (block 29); otherwise (i.e., if the PE state is currently a Slave), it functions as a Transit PE and forwards the packet transparently over the PW towards the peer PE (block 30).

FIG. 13 illustrates a flow chart for MAC learning at a PE which is part of a V-PE. As described earlier, MAC learning is applicable for MP VPNs only. The control unit CU and hardware at the PE is provided with the novel proposed software and ensures address learning according to the block diagram illustrated in that figure, wherein.

In Block 40, an incoming data packet is received at the FE.

In Block 41, a check is carried out to determine whether there are new addressed associated with packets arriving:
a) from the directly connected CE, or
b) over the single PW from the peer PE with which the PE shares a. V-PE, or
c) over the single PW from the remote provider site (L2 site).

For each of these three options, there are different follow up steps based on the determination made:

For option a) (i.e. the packet arrived from the directly connected CE), block 42 further checks whether the current state of the PE is a. Slave. If in the affirmative (block 43), no learning takes place, because a Slave should not learn addresses; otherwise (i.e., if the PE current state is Master), it associates the new MAC address with the CE (block 44).

For option b), i.e. when received from the peer PE, no learning takes place (block 45) either because a. Master PE should not accept packets from the peer PE, or because a Slave PE functions as Transit PE and should not learn MAC addresses.

For option c), i.e. when received from the remote provider site, block 46 further checks whether the current state of the PE is a Slave. If in the affirmative (block 47), no learning takes place, because a Slave should not learn addresses; otherwise (i.e., if it is a Master), it associates the new MAC address with the remote site's formal endpoint (block 48).

Meeting the Objectives

This section further describes how the proposed solution meets the objectives as set forth hereinbefore.

(A1) The topologies of FIG. 3 and FIG. 4 are both supported with a single SW connection and auto recovery as desired.

(A2) Only PEs that are part of V-SE are aware of the redundancy arrangement.

(A3) Signaling exchange for the purpose of the redundancy arrangement is carried out only between the PEs of the same V-PE. There is no redundancy-related signaling between the sites. Signaling is limited to status info and Master-Slave role selection, which do not introduce a heavy traffic load.

(A4) Auto failure recovery within a period of under 200 millisecond is achievable, owing to the signaling being light and confined to the two PEs of the V-PE.

(A5) Faults in the provider network can be covered using standard protection mechanisms. No Master-Slave role change is required, nor there is a need for MAC flushing.

(A6) No L2 loops occur, since there is only a single PW between the two opposite sites.

While the invention has been described with reference to specific, non-limiting examples, it should be appreciated that other versions of the method, as well as other embodiments of the system, the network node and the management entity may be proposed, and are to be considered part of the invention as far as being defined by the following claims.

The invention claimed is:

1. A system for interconnecting two L2 network sites, the system comprising:
a first L2 network site, a second L2 network site, a provider network interposed between the two L2 networks sites and a plurality of provider edge (PE) nodes, wherein the first and the second L2 network sites are interconnected via a single pseudo-wire (PW) connection extending between the two different L2 network sites,
the first L2 network site includes at least a first PE node that functions as a first formal endpoint (FEP) node and a second PE node that functions as a non-formal endpoint (NFEP), wherein the two PE nodes are connected to a first customer element (CE), and wherein one PE node of the two PE nodes has a role of a Master for conveying traffic received to/from the first CE, and the other PE node has a role of a Slave;
the second L2 network site includes a PE node that functions as a second formal endpoint (FEP) node, and is connected to a second customer element (CE), wherein packets received from the second CE at the PE node that functions as the second FEP node for conveyance to the first CE, are being directed towards the first FEP node;
the PW is formed between the first FEP node associated with the first L2 network site and the second FEP node associated with the second L2 network site, wherein traffic being conveyed along the PW is carried by two label switched paths (LSPs) in opposite directions from the first FEP node to the second FEP node and vice versa, and wherein each of the two LSPs traverses the second PE node of the first L2 network;
wherein the system is configured to ensure that:
a) in case of a failure in the first PE node when acting as a Master, then the second PE node starts operating as a new Master while no PE node belonging to the second L2 network site is aware of the change that has occurred; and
b) in case of a failure in the second PE node when acting as a Master, then the first PE node starts operating as a new Master while the second PE node is bypassed, so that traffic is conveyed to/from the second L2 network site from/to the first PE node while no PE node of the second L2 network site is aware of the change that has occurred.

2. The system of claim 1, further configured to ensure that:
c) in case of a failure in a connection between the first PE node and the first CE, then the second PE node starts operating as a new Master while no PE node belonging to the second L2 network site is aware of the change that has occurred.

3. The system of claim 1, wherein the first PE node and the second PE node are logically inter-connected and combined into virtual PE node.

4. The system of claim 1, wherein when a PE becomes a Master, it flushes previously stored MAC addresses.

5. The system of claim 1, wherein the first PE node and the second PE node provide PW redundancy while using a single PW connection.

6. A method for interconnecting two L2 network sites, the method comprising:
providing a first L2 network site, a second L2 network site, a provider network interposed between the two L2 network sites and a plurality of provider edge (PE) nodes, wherein the first and the second L2 network sites are interconnected via a single pseudo-wire (PW) connection extending between the two different L2 network sites, including in the first L2 network site at least a first PE node that functions as a first formal endpoint (FEP) node and a second PE node that functions as a non-formal endpoint (NFEP), wherein the two PE nodes are connected to a first customer element (CE), and wherein one PE node of the two PE nodes has a role of a Master for conveying traffic received to/from the first CE, and the other PE node has a role of a Slave;

including in the second L2 network site a PE node that functions as a second formal endpoint (FEP) node, and is connected to a second customer element (CE), wherein packets received from the second CE at the PE node that functions as the second FEP node for conveyance to the first CE, are being directed to the first FEP node;

forming the PW between the first FEP node associated with the first L2 network site and the second FEP node associated with the second L2 network site, wherein traffic being conveyed along the PW is carried by two label switched paths (LSPs) in opposite directions from the first FEP node to the second FEP node and vice versa, and wherein each of the two LSPs traverses the second PE node of the first L2 network;

wherein the method includes:
 a) in case of a failure in the first PE node when acting as a Master, starting to operate the second PE node as a new Master while no PE node belonging to the second L2 network site is aware of the change that has occurred; and
 b) in case of a failure in the second PE node when acting as a Master, starting to operate the first PE node as a new Master while the second PE node is bypassed, so that traffic is conveyed to/from the second L2 network site from/to the first PE node while no PE node of the second L2 network site is aware of the change that has occurred.

7. The method of claim 6, further includes:
 c) in case of a failure in a connection between the first PE node and the first CE, starting to operate the second PE node as a new Master while no PE node belonging to the second L2 network site is aware of the change that has occurred.

8. The method of claim 6, wherein the first PE node and the second PE node are logically inter-connected and combined into virtual PE node.

9. The method of claim 6, wherein when a PE becomes a Master, the method further includes flushing previously stored MAC addresses.

10. The method of claim 6, wherein the first PE node and the second PE node provide PW redundancy while using a single PW connection.

11. A non-transitory computer readable medium storing a computer program for performing a set of instructions to be executed by one or more computer processors, the computer program is configured and operable to perform the method according to claim 6.

* * * * *